US012524629B2

(12) United States Patent
Cushman, II et al.

(10) Patent No.: US 12,524,629 B2
(45) Date of Patent: Jan. 13, 2026

(54) UNIVERSAL DATA LANGUAGE TRANSLATOR

(71) Applicant: Collibra Belgium BV, Brussels (BE)

(72) Inventors: James B. Cushman, II, Longboat Key, FL (US); Aurko Joshi, West Bloomfield, MI (US); Satyender Goel, Chicago, IL (US)

(73) Assignee: Collibra Belgium BV, Brussels (BE)

( * ) Notice: Subject to any disclaimer, the term of this patent is extended or adjusted under 35 U.S.C. 154(b) by 475 days.

(21) Appl. No.: 17/364,842

(22) Filed: Jun. 30, 2021

(65) Prior Publication Data
US 2023/0004729 A1    Jan. 5, 2023

(51) Int. Cl.
*G06F 40/47* (2020.01)
*G06F 40/242* (2020.01)
*G06F 40/49* (2020.01)
*G06N 20/00* (2019.01)

(52) U.S. Cl.
CPC ............ *G06F 40/47* (2020.01); *G06F 40/242* (2020.01); *G06F 40/49* (2020.01); *G06N 20/00* (2019.01)

(58) Field of Classification Search
CPC ........ G06F 40/47; G06F 40/242; G06F 40/49; G06F 40/16; G06F 40/18; G06F 40/216; G06F 40/284; G06F 16/36; G06N 20/00
See application file for complete search history.

(56) References Cited

U.S. PATENT DOCUMENTS

| 9,390,132 B1* | 7/2016 | Kapoor | G06F 16/24564 |
| 2006/0106824 A1* | 5/2006 | Stuhec | G06Q 30/08 |
| 2018/0032497 A1* | 2/2018 | Mukherjee | G06V 30/416 |

FOREIGN PATENT DOCUMENTS

WO    WO-2007029240 A2 *   3/2007   ........... G06F 17/279

OTHER PUBLICATIONS

International Search Report and Written Opinion of the International Search Authority for International Application No. PCT/EP2022/068963 dated Oct. 7, 2022, 14 pages.

* cited by examiner

*Primary Examiner* — Khanh B Pham
*Assistant Examiner* — Samuel C Sharpless, III
(74) *Attorney, Agent, or Firm* — Perkins Coie LLP

(57) ABSTRACT

The present disclosure is directed to a universal data language (UDL) translator. Specifically, the systems and methods disclosed enable input data from a variety of sources to be translated into a UDL that can be consistently analyzed and compared against other sources of data. For example, an entity may upload input data that has a plurality of data terms and definitions (e.g., header column in a spreadsheet). These terms may be duplicative and/or inaccurate with respect to the underlying data. If the entity wishes to compare and transact data within a data marketplace, the entity may not fully comprehend what data it is missing and/or what data another entity may have to offer for trade. To remedy this problem of business semantic management, the present invention discloses steps for creating a UDL and a UDL translator so that any input data can be translated to UDL.

18 Claims, 8 Drawing Sheets

UNIVERSAL DATA LANGUAGE TRANSLATOR

CROSS-REFERENCE TO RELATED APPLICATION(S)

This application is related to U.S. patent application Ser. No. 16/844,927, titled "CONTEXT DRIVEN DATA PROFILING"; U.S. patent application Ser. No. 16/776,293 titled "SYSTEMS AND METHOD OF CONTEXTUAL DATA MASKING FOR PRIVATE AND SECURE DATA LINKAGE"; U.S. patent application Ser. No. 17/103,751, titled "SYSTEMS AND METHODS FOR UNIVERSAL REFERENCE SOURCE CREATION AND ACCURATE SECURE MATCHING"; U.S. patent application Ser. No. 17/103,720, titled "SYSTEMS AND METHODS FOR DATA ENRICHMENT"; and U.S. patent application Ser. No. 17/219,340, titled "SYSTEMS AND METHODS FOR AN ON-DEMAND, SECURE, AND PREDICTIVE VALUE-ADDED DATA MARKETPLACE", which are hereby incorporated by reference in their entirety.

TECHNICAL FIELD

The present disclosure relates to systems and methods for translating input data into a universal data language.

BACKGROUND

Entities maintain large amounts of data that may contain different semantic structures and use different terms that refer to the same object or element. To harmonize these semantic discrepancies requires manual and laborious processes that are inefficient and prone to error. Typical semantic integration is manual, brittle, and can easily go out of date without dedicated resources ensuring consistent and ongoing semantic harmony. Additionally, many entities manage redundant business semantics in their data governance efforts, not only within their own enterprises, but also between different enterprises. For example, one particular data element may have two different semantic identifiers associated with it, specifically for regulatory compliance reasons. Yet, the underlying data element is the same for both semantic identifiers. Identifying and harmonizing these semantic differences, in today's current market, is solved using laborious and error-prone manual processes.

Some common content that often presents issues for entities includes (i) business terms and definitions, (ii) references to data assets and data models, (iii) policies governing appropriate data use, and/or (iv) commonly used data classifications and information sensitivity classifications, among others. In some scenarios, as much as 35-40% of data that entities manage is redundant and contains different (and sometimes, conflicting) identifiers, leading to organizational bloat and inefficiencies. In particular, running internal data analyses becomes problematic when different identifiers are used for the same underlying data element, as an organization may be unaware of the duplicity of the identifier. This can lead to ignoring certain data that leads to creating faulty datasets, which may lead to inaccurate data analyses.

As such, there is an increased need for systems and methods that can address the challenges of modern-day business semantics, including efficiently identifying the duplicative and redundant data and subsequently harmonizing that data using a translation service.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
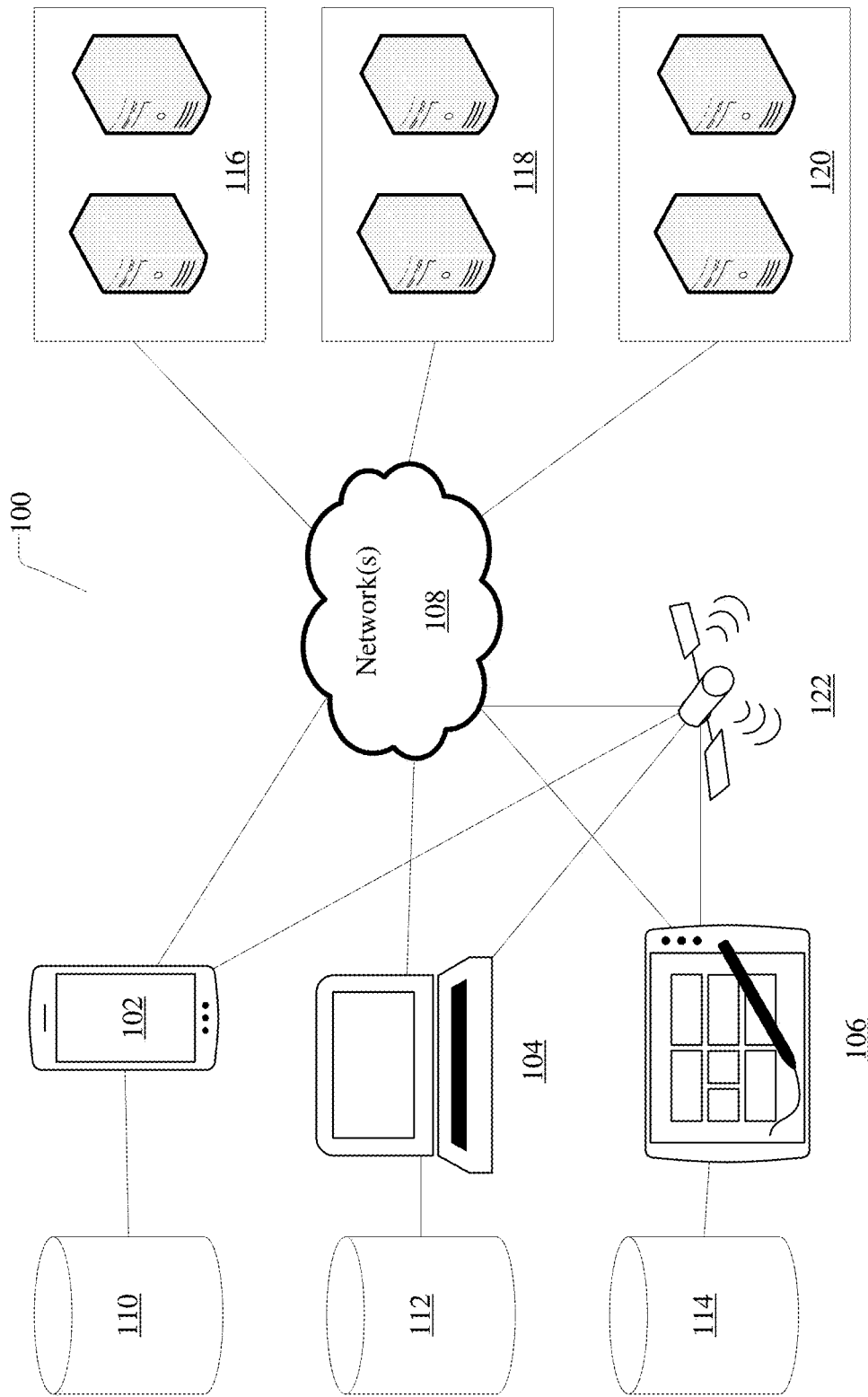
FIG. 1 illustrates an example of a distributed system for a universal data language translator, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with a universal data language translator and translating input data into a universal data language. In today's current marketplace, many entities face problems with standardizing business semantics for certain data elements. For example, in the financial industry, many banks and regulators face issues harmonizing data because several data elements are labeled differently, although each data element has the same underlying data value and has the same meaning. There has been an increased need for glossary standardization within the financial industry. This has become especially true when new regulations and standards are published, which oftentimes define new terms and data points that must be tracked by certain organizations. In some instances, entities may have already been recording certain data elements prior to a new regulation or standard, but the new regulation and/or standard may have defined a certain data element differently than how the organization may have already been recording and tracking that data element internally. As such, a semantic inconsistency may originate because new regulations and/or standards are released.

A solution for this problem is the creation of a universal data language (or "UDL"). A UDL may be established to harmonize certain data identifiers and elements across certain industries. For example, a UDL may be able to harmonize new terms established from a regulatory body with terms used internally at a bank. Rather than having to manually map the bank-specific terminology to the regulatory body terminology, an entity (e.g., a bank) may be able to rely upon a UDL translator to automatically map the data element to the regulatory body term. Beyond terms and definitions, metadata may also be mapped and harmonized.

A UDL translator may rely on artificial intelligence and machine learning algorithms to efficiently and accurately map large amounts of inconsistently labeled data elements and resolve these inconsistencies using the UDL. For instance, the system may receive input data from a user, such as a bank. The input data may be analyzed for data quality, specifically noting certain data elements and metadata. Data quality may be assessed by evaluating the completeness of the data, duplicative entries, inactive/unused data terms, and outdated values/terms. The input data may be cleaned and subsequently translated using the UDL translator. Certain terms in the input data may be mapped to UDL terms. Other terms that may not appear in the UDL (at least, at the time of the translation) may be analyzed using at least one ML algorithm, where certain characteristics associated with the term (data element) may be analyzed. For instance, the term may be industry-specific, may have certain output characteristics (e.g., accounting format, unit identifiers, etc.), and may have a certain number of entries that correlate with another data element. If the data term's analyzed characteristics are substantially similar to a UDL term, the system may automatically map that term to the UDL term. Alternatively, the system may make a suggestion to the user that a certain identified data element is equivalent to a particular UDL term, and the user may be requested to either accept or decline the system's UDL mapping recommendation.

By using a UDL translator, validity of data may be increased because inconsistent data terms, formats, and values will be decreased. Records may be consolidated because less redundant (and different) terms will be used. Additionally, when transmitting and/or receiving data from a third-party source, harmonizing and conducting analysis on the third-party data will be more efficient and accurate, as data cleaning and interpretation will be reduced because the UDL translator will have already automatically translated the file to a commonly-known and commonly-used ontology.

Accordingly, the present disclosure provides a plurality of technical benefits including but not limited to: enabling more efficient use of electronic resources for data consolidation and harmonization; providing more efficient storage management because the translation steps match and consolidate certain data elements; decreasing the potential for manually re-mapping and/or re-formatting data based on newly defined terms and ontologies; and decreasing manual overload of electronic devices, since the translation may occur via computing devices running intelligent algorithms to identify deficiencies in a dataset and remedying those deficiencies using a UDL translator, among other examples. In short, a UDL translator allows for faster processing time of datasets and more efficient uses of computer memory due to the reduced redundancy and duplicity of data elements and terms in a dataset by implementing a UDL.

FIG. 1 illustrates an example of a distributed system for a universal data language translator, as described herein. Example system 100 presented is a combination of interdependent components that interact to form an integrated whole for consolidating and enriching data on a data marketplace. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain client-specific data with client-specific data terminology and labels. Client devices may download a UDL translator program via network(s) 108 that may be applied to the client-specific data. In other embodiments, client devices may upload client-specific data via network(s) 108 to a third-party platform that manages the UDL translator, and the UDL translation system described herein may be applied to the incoming client-specific data and terms. The client-specific data may be stored in local databases 110, 112, and 114. Client-specific data may be transmitted via network(s) 108 and/or satellite 122 to server(s) 116, 118, and/or 120. Server(s) 116, 118, and/or 120 may be third-party servers owned by a Data Marketplace Platform and/or a UDL administrator. In other examples, client-specific data may be stored in servers (in addition to or instead of local client devices and local databases) and may be transmitted from client servers to third-party servers via network(s) 108 and/or satellite 122. After the client-specific data is translated via the UDL translator, the translated client-specific data may be stored in remote servers 116, 118, and/or 120 for future use by the UDL translator (e.g., training data to continue increasing the intelligence of at least one machine learning algorithm mapping client-specific terms to UDL terms). In other examples, the translated client-specific data may be transmitted back to the client devices via network(s) 108.

In aspects, a client device, such as client devices 102, 104, and 106, may have access to one or more datasets or data sources and/or databases comprising client-specific data. In other aspects, client devices 102, 104, and 106, may be equipped to receive broadband and/or satellite signals carrying UDL translation mapping data and/or UDL translated client-specific data. The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices.

To further elaborate on the network topology, client devices 102, 104, and/or 106 (along with their corresponding local databases 110, 112, and 114) may transmit standard terms to a third-party platform that manages a UDL translator. "Standard terms" may refer to a standard business glossary that comprises standard data terminology among different industries, as well as industry-specific terminology, geographic terminology, and general terminology (i.e., ubiquitous terms). These standard terms may be transmitted via client device(s) 102, 104, and/or 106 over network(s) 108 to the third-party platform that manages the UDL translator.

The standard terminology data received by the third-party platform may then be used to construct a UDL translator and/or improve upon an already-existing UDL translator.

The procedure for uploading client-specific data and uploading standard terminology to the third-party platform may be similar, in that the data may be stored locally initially and subsequently transmitted to third-party servers for analysis, consolidation, and translation, among other actions. In some examples, the data may be hashed or encrypted on the client-side prior to transmission. FIG. 1 depicts a network topology that may be used in a Client-Side environment and/or a Reference-Side environment. The Reference-Side environment may include standards-setting entities that define business terminology and industry-specific data terminology. The Reference entities may be trusted sources (e.g., business glossary stewards, ontologists, etc.). The Client-Side environment refers to a particular business with specific client data terminology that may be incompatible with other broader terminology in a similar industry, and, as such, the client is seeking to translate the client-specific data into a universally understandable data language using a UDL translator. In other words, client devices 102, 104, and/or 106 may belong to the Client Environment in one example and belong to the Reference Source Environment in another example.

Figure 2:
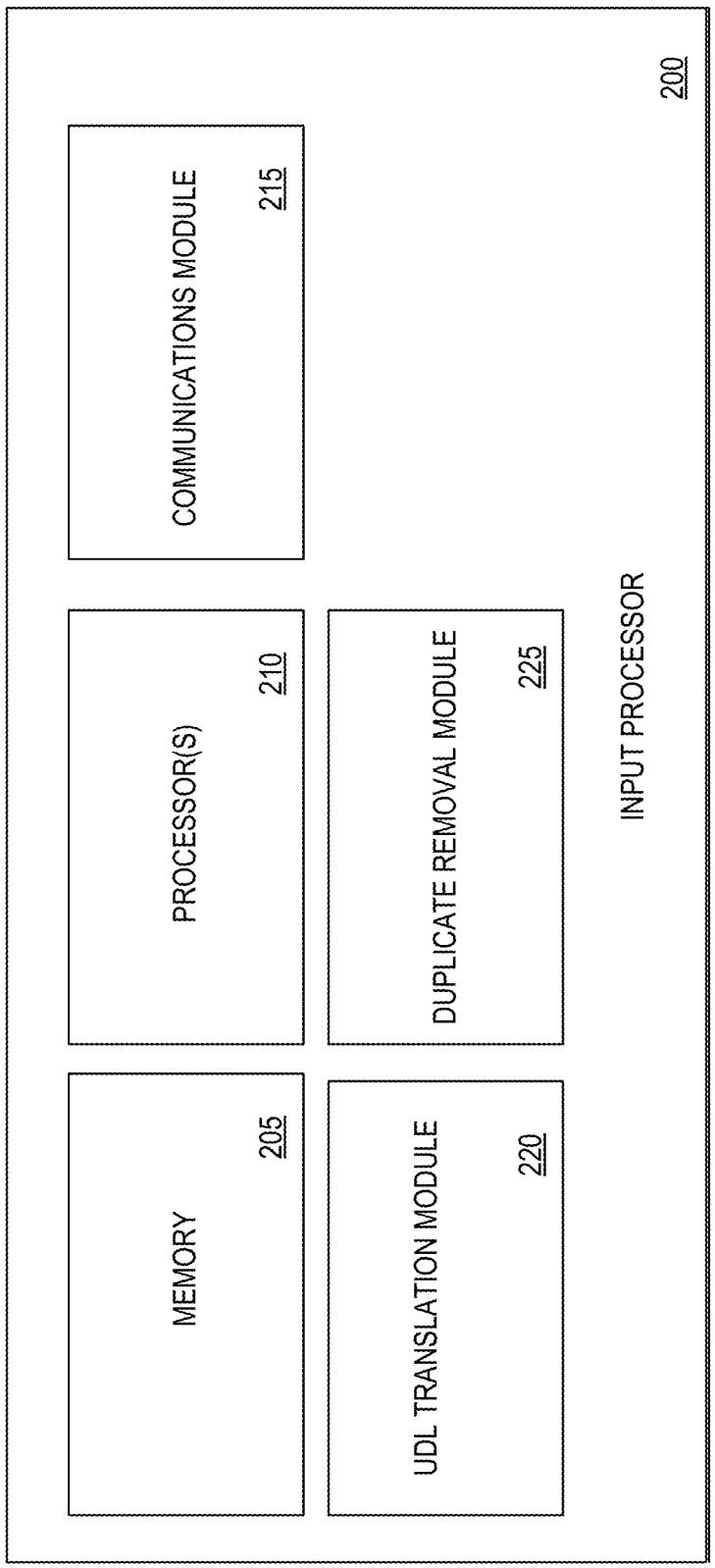
FIG. 2 illustrates an example input processor for operating a universal data language translator, as described herein.

FIG. 2 illustrates an example input processor for operating a universal data language translator, as described herein. Input processor 200 may be embedded within a client device (e.g., client devices 102, 104, and/or 106), remote web server device (e.g., devices 116, 118, and/or 120), and other devices capable of implementing systems and methods for operating a universal data language translator. The input processing system contains one or more data processors and is capable of executing algorithms, software routines, and/or instructions based on processing data provided by at least one client source and/or reference source. The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc. According to embodiments shown in FIG. 2, the disclosed system can include memory 205, one or more processors 210, communications module 215, UDL Translation module 220, and duplicate removal module 225. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of UDL Translation module 220 and/or duplicate removal module 225, as well as communications module 215. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

In some example aspects, memory 205 may store certain business terms used for the creation of a UDL translator, as well as applying an already-existing UDL translator to client-specific data terminology. Specifically, memory 205 may store terminology related to business glossaries, industry-specific data labels, geographic terminology, language equivalencies, and/or other general terminology that may be used to map client-specific data labels to a UDL.

Communications module 215 is associated with sending/receiving information (e.g., translated via UDL translation module 220 and sanitized for duplicates via duplicate removal module 225), commands received via client devices or server devices, other client devices, remote web servers, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 215 sends information output by UDL translation module 220 (e.g., newly translated dataset) and/or by duplicate removal module 225 (e.g., de-duplicated translated dataset), and/or to client devices 102, 104, and/or 106, as well as memory 205 to be stored for future use. In some examples, communications modules may be constructed on the HTTP protocol through a secure REST server(s) using RESTful services.

UDL Translation module 220 is configured to receive business terms, semantics, and metadata from at least one trusted source. The business terms, semantics, and metadata may be general business terms (e.g., business glossary terms), industry-specific terms (e.g., how data terms are characterized in Finance, Life Sciences, Chemicals, and Federal government), geographic terms (e.g., how a certain piece of data is labeled in the United States vs. China), and language-specific terms (e.g., how a certain piece of data is labeled in English vs. French), among others.

UDL translation module 220 may be configured to support a Create-Read-Update-Delete ("CRUD") data structure for a database. A UDL may continuously evolve using a CRUD database. As new terms are added to the database, the UDL translation module 220 may create new entries for those terms, analyze those terms (i.e., Read), and update or delete existing UDL terms in the database based on the reception of those new terms. Factors that may be assessed when the determining whether to create, update, and/or delete a new term may include the veracity of the source of the term (e.g., a trusted source who has been the editor of a business term glossary for several decades may have higher confidence score than a source who has published an industry-specific glossary for only the past three years), the similarity of the term to already-existing terms in the database (e.g., if a newly received business term is similar enough to an already-existing term, then the newly-received term may be associated with the already-existing term; this may be considered an update operation within the CRUD data structure), and the presence of a term in the database (e.g., if a term already exists in the database, then the newly received term may be deleted to avoid duplication; alternatively, if the newly received term has not been established and has a low similarity index with other terms in the UDL database, then a new term may be created), among other factors.

UDL translation module 220 may also comprise at least one machine-learning (ML) algorithm that may intelligently analyze newly-received data and compare to the already-existing set of data in the UDL database. For instance, a newly-received term may be provided to a ML algorithm to assess a similarity score with other already-existing terms in the UDL database. The ML algorithm may consider the data type, context, source, etc. of the newly-received term and compare it with other data types, contexts, and sources etc. existing in the UDL database. Terms, definitions, relations, taxonomies, semantics, references, ontologies, and other language tenets may be relied upon in determining whether to associate a newly-received term with an already-existing term (i.e., harmonizing two different terms that are labeling the same data) or to create a new term that is associated with a particular data type.

For example, the UDL translation module 220 may receive the financial term "acid-test ratio." The system may then analyze the term using at least one ML algorithm and decide the next action for that term. Here, a word-for-word scan of the UDL database may reveal that "acid-test ratio" is not present in the database. However, the ML algorithm may have identified a term that has a high similarity score to the identified term (e.g., "quick ratio"). Although the only overlapping words between the two terms is "ratio," the ML algorithm may analyze characteristics of the terms beyond their semantic identifiers, such as the underlying equations driving the ultimate data results. In this instance, the ML algorithm may have identified that that the acid-test ratio data column is calculated by taking the ratio of current assets minus inventories, accruals, and prepaid items to current liabilities. In some examples, "inventories," "accruals," "prepaid items," and "current liabilities" may all be other data labels appearing in a similar environment (e.g., the same spreadsheet or database) as acid-test ratio. The ML algorithm may have also determined that the quick ratio (which already exists in the database) is also calculated using the same algorithm, although the terms may have been labeled slightly differently (e.g., instead of "inventories," the quick ratio uses "inventory of goods"). Regardless, the quick ratio that already exists in the UDL database is calculated by taking the current assets minus accruals, inventories, and prepaid items, and then dividing that number by the current liabilities. This is the same formula as the acid-test ratio data term. As such, the UDL translation module 220 may determine that the acid-test ratio term is the same as the quick ratio term, so the acid-test ratio term is added to the UDL library as a synonym to the quick ratio term.

Duplicate Removal module 225 is configured to detect duplicates within the UDL library. Duplicate removal module 225 may also receive a new term in conjunction with the UDL translation module 220. Duplicate removal module 225 may first check if the term is exactly described in the UDL library. If so, then the duplicate removal module 225 may then check the underlying definition of the term (e.g., such as an equation that drives the ultimate value of the term). If the definitions also happen to be the same, then the newly-received term may be deleted from the UDL library. By removing duplicates immediately upon reception to the UDL database, the system decreases confusion and bloat regarding certain data terminologies and ontologies. This feature of the UDL translation system may be considered as a "search before create" function, where the newly received term is first compared against the already-existing database of UDL terms, and if the term and definition match up, then the term is automatically discarded. In some example aspects, the duplicate removal module 225 may indicate to a user that the term is already a duplicate of another term. In other examples, the duplicate removal module 225 may prevent the user from proceeding forward with creating a new term within the UDL library once it is determined that it is a duplicate.

Figure 3:
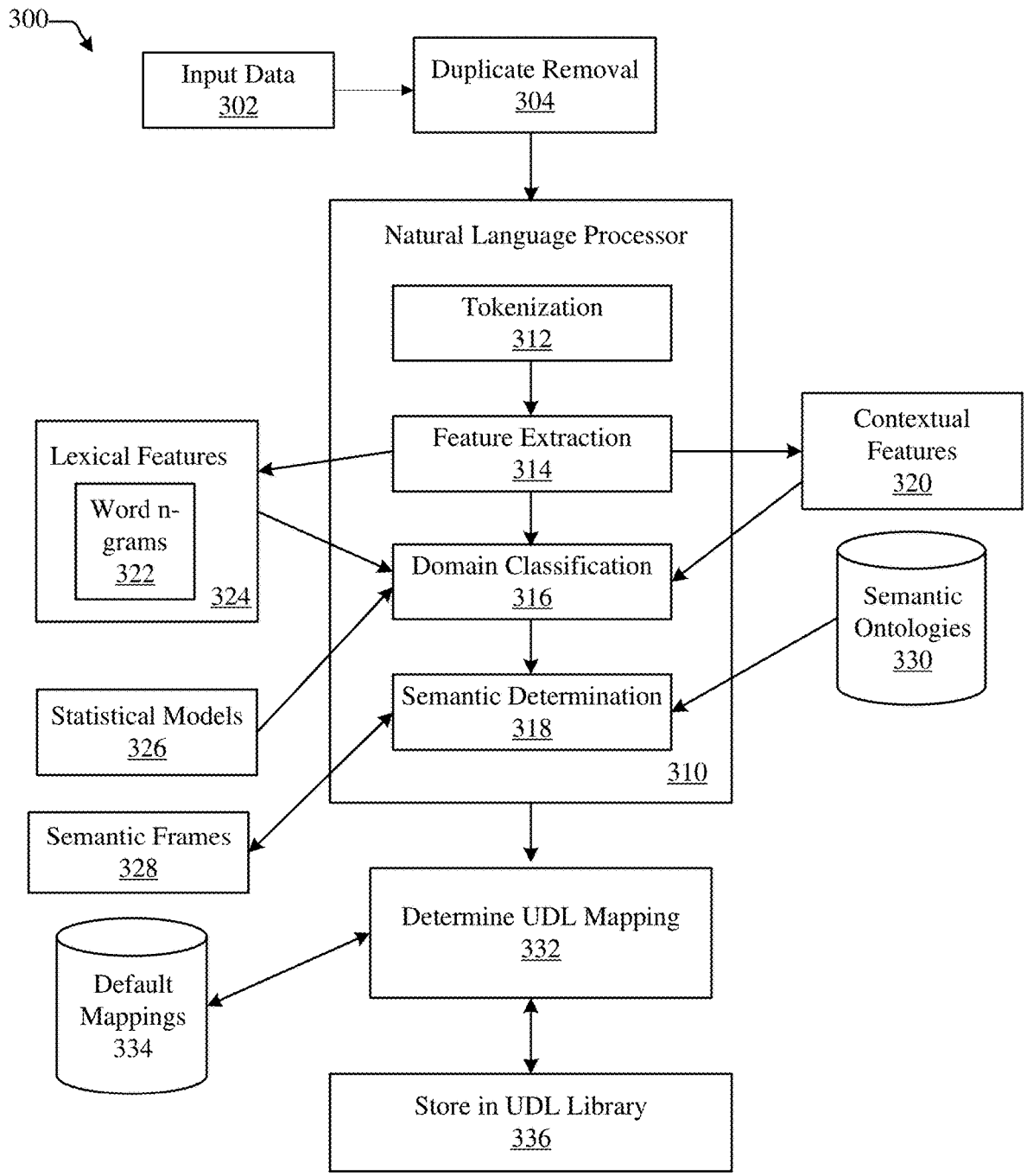
FIG. 3 illustrates an example method for constructing a universal data language translator, as described herein.

FIG. 3 illustrates an example method for constructing a universal data language translator, as described herein. Input data 302 may be client-specific data terminology and/or standards-based terminology from a trusted source, as described with respect to FIG. 1. The input data may consist of textual input, speech input, handwritten/stylus input, and other various types of input. For example, textual input may be input from spreadsheets or databases that show columns of data with a header row that includes data labels for each column of data. Once the input data 302 is received, the input data may proceed to a duplicate removal process 304 (e.g., duplicate removal module 225).

Duplicate removal step 304 may analyze the input data and compare it to already-existing terms, ontologies, semantics, metadata, and other data that is contained within the UDL database (or library). If a word-for-word (or character-for-character) match is detected between the input data 302 and already-existing data in the UDL database, then the duplicate removal process proceeds to determine if the definitions are the same. As described previously, the definitions of the terms may be determined by analyzing the underlying equations that render the values displayed in the columns of data (i.e., the values shown in certain cells are dependent on equations using data from other columns; the duplicate removal step 304 may analyze those other columns to determine whether the equations ("definitions") are the same). If the definitions are the same, the input data 302 may be discarded at step 304 prior to analysis by natural language processor 310.

If the input data 302 passes the duplicate removal tests at step 304, the input data 302 is provided to natural language processor (NLP) 310. The natural language processor 310 may parse the input data 302 and extract various semantic features and classifiers, among other operations. The input data 302 may be converted into semantic representations that may be understood and processed by a machine utilizing machine-learning algorithms to intelligently disassemble the input data and provide the most accurate and appropriate UDL definition and/or mappings.

In some example aspects, the natural language processor 310 may begin with tokenization operation 312. The tokenization operation 312 may extract specific tokens from the input data. A "token" may be characterized as any sequence of characters. It may be a single character or punctuation mark, a phrase, a sentence, a paragraph, multiple paragraphs, or a combination of the aforementioned forms. During the tokenization operation 312, key words (or characters) from the input data 302 may be isolated and associated with general topics that may be preloaded into the natural language processor via a trusted source (e.g., business glossary terminology, semantics, and ontologies). These topics may be located in a preexisting matrix of data where certain tokens are associated with certain topics. For example, one matrix of data may associate the term "gross income" with a financial industry classification. Another matrix may be associated with the FDA ClinicalTrials.gov glossary and associate the term "NCT number" (e.g., a particular term used in the life sciences industry as a unique identification code given to each clinical study record; 8-digit number) with the life sciences industry, specifically clinical trials. Other data terms (and tokens) may be associated with other industry-specific terms, semantics, and ontologies, as described herein.

After the input data 302 is processed through the tokenization operation 312, the input data may then be analyzed by the feature extraction component 314. The feature extraction component may extract lexical features 324 and contextual features 320 from the input data 302 for use by the domain classification component 316. The lexical features 324 that may be analyzed in the feature extraction component 314 may include, but are not limited to, word n-grams 322. A word n-gram is a contiguous sequence of n words from a given sequence of text. As should be appreciated, analyzing word n-grams may allow for a deeper understanding of the input data and therefore provide more accurate and intelligent UDL definitions and mappings. The machine-learning algorithms may be able to compare thousands of n-grams, lexical features, and contextual features in a matter of seconds to extract the relevant features of the input data. Such rapid comparisons are impossible to employ manually. The contextual features 320 that may be analyzed by the feature extraction component 314 may include, but are not limited to, a top context and an average context. A top context may be a context that is determined by comparing the topics and key words of the input data with a set of preloaded contextual cues. An average context may be a context that is determined by comparing the topics and key words extracted from the input data 302 with historical processed input data, historical UDL definitions and mappings, manual inputs, manual actions, public business and industry-specific terminology dand ontology references, and other data. The feature extraction component 314 may also skip contextually insignificant input data when analyzing the textual input. For example, a token may be associated with articles, such as "a" and "an." However, because articles are typically insignificant in the English language, the feature extraction component 314 may ignore these article tokens.

After the feature extraction component 314 extracts the pertinent lexical features 324 and contextual features 320 of the input data 302, the input data 302 may be transmitted to the domain classification component 316. The domain classification component 316 analyzes the lexical features 324 and the contextual features 320 that were previously extracted from the feature extraction component 314. These lexical and contextual features may be grouped into specific classifiers for further analysis. The domain classification component 316 may also consider statistical models 326 when determining the proper domain that should be selected for the possible action responses. In some example aspects, the domain classification component 316 may be trained using a statistical model or policy (i.e., prior knowledge, historical datasets, commonly-used standards/definitions/terminologies/ontologies/etc.) with previous input data. For example, as previously mentioned, the term "acid-test ratio" may be associated with a specific equation token (e.g., acid-test ratio=quick ratio=(current assets–inventory)/current liabilities). Additionally, the term "acid-test ratio" may be associated with a broader domain classification, such as a "finance" domain. In yet other examples, "acid-test ratio" may be associated with a specific business function or department within a business, such as the "finance department." Thus, even though a certain acid-test ratio data term may be associated with a non-financial industry company, the acid-test ratio term may still be associated with a sub-domain of "finance," such as "corporate finance department," or the like. Previous input data and UDL definitions/related to the "finance" domain may be analyzed at this step.

After proper domain classifications are assigned to the input data at operation 316, the input data may then be sent to the semantic determination component 318. The semantic determination component converts the input data into a domain-specific semantic representation based on the domain that was assigned to the input data by the domain classification component 316. The semantic determination component 318 may draw on specific sets of concepts and categories from a semantic ontologies database 330 to further narrow down the set of appropriate UDL definition and/or mappings to assign to a particular term in the input data and/or to present to a user for approval. For example, a certain data term in the input data may be "Phase II." On its face, the term "phase II" is ambiguous. However, other contextual keywords surrounding the "phase II" data column may provide more semantic clarity. For instance, the title of the dataset may be "Drug XYZ Clinical Trial Results Comparison Phases I-IV." The key words "Drug XYZ" and "Clinical Trial" have previously been assigned domains by the domain classification component 316, and as a result, the semantic determination component 318 may then determine that the "phase II" data column is referring to a medical value of success or failure specifically for the phase II clinical trials.

In other example aspects, the semantic determination component 318 may have pre-defined semantic frames 328 associated with third-party applications and entities. For example, continuing with the "phase II" clinical trial example, the system 300 may have imported particular semantic frames 328 that are associated with the FDA or NIH as they relate to clinical trial data. Information that may be predefined by the semantic frames 328 may include, but is not limited to the following clinical trial data terms: age group, blood type, blood pressure, arm, collaborator, contact, investigator, last verified, patient registry, phase number, reporting group, results, state, sponsor, and NCT number. Specifically, once the data term "phase II" is classified by domain classifier 316 as a life sciences and/or clinical trial domain, then the system 300 may refer to preloaded semantic frames 328 to further define and map the term "phase II" to the UDL, as the term "phase II" is used in the input data 302.

After the natural language processor 310 has completed its analysis of the input data, the input data may be transmitted to the determine possible UDL mappings at step 332. By funneling the input data through the natural language processor 310, many of the initial UDL definitions and mappings may have been filtered out. Thus, determine UDL mapping operation 332 may be characterized as the final filter in determining which UDL definition mapping to display to the user. The determine UDL mapping operation 332 may utilize a priority algorithm that considers not only the processed input data from the natural language processor 310, but also historical UDL mappings and preexisting definitions from the UDL library 336, as well as default UDL mappings from database 334 (e.g., trusted source business glossary mappings).

In some example aspects, the final UDL definition assigned to a particular term from the input data 302 may be stored in UDL library 336 for future consideration, such as by the machine-learning algorithm(s) aiding the natural language processor 310. Future UDL translations using system 300 may become more intelligent over time as more and more terms are analyzed, processed using NLP 310, and mapped to a universal data language terminology and ontology.

Figure 4:
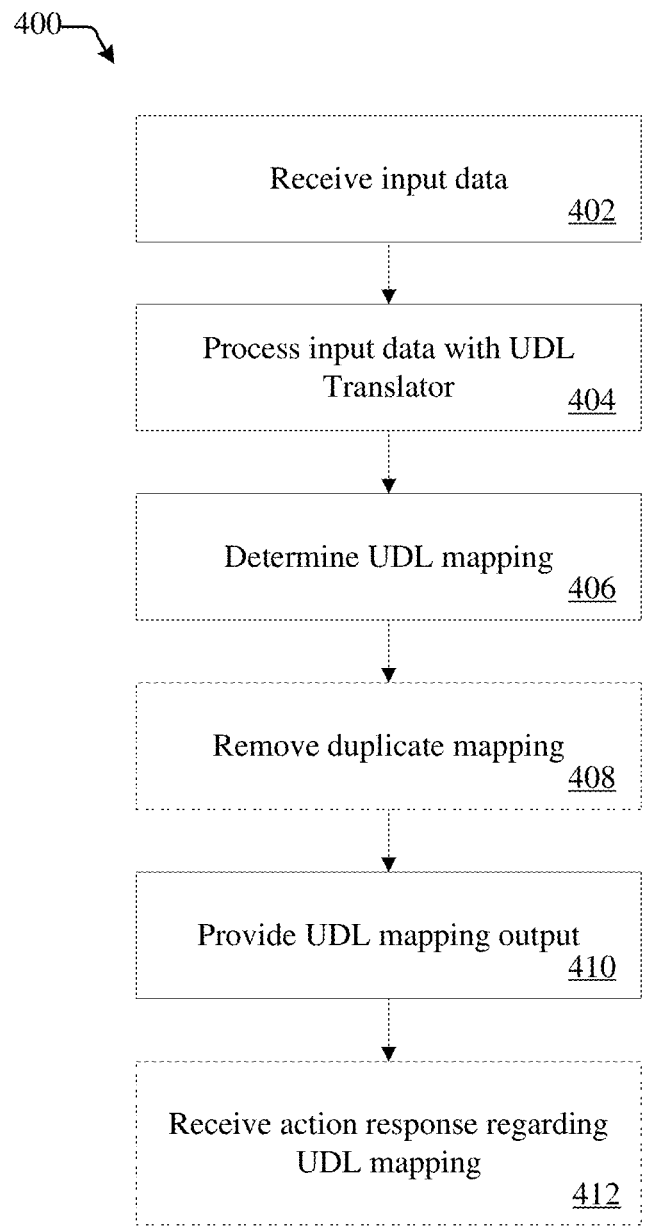
FIG. 4 illustrates an example method for translating input data using a universal data language translator.

FIG. 4 illustrates an example method for translating input data using a universal data language translator. Method 400 begins with step 402, where input data is received. As described previously, input data may be in a variety of forms, such as textual input, voice input, multimedia input, and other forms of input. The input data 402 may be processed at step 404 using a universal data language translator. The UDL translator is described in detail with respect to FIGS. 2 and 3. The processing within the UDL translator at step 404 includes applying at least one natural language processor to the input data, wherein the natural language processor utilizes at least one ML algorithm to intelligently extract lexical and semantic features from the input data. These semantic and lexical features are then used to determine accurate definitional and mapping within a UDL library.

At step 406, the input data is mapped to a certain UDL term based on UDL terminologies, ontologies, taxonomies, and definitions. At step 408, duplicate terms may be removed from the UDL library. Optional step 408, in some examples, may occur prior to the processing step 404. In some instances, however, terms may need to be analyzed using a natural language and machine-learning algorithms to determine whether duplicates actually exist. This may be true when the characters and/or words of the terms do not match up exactly to the already-existing terms/words in the UDL library. Further analysis may be required to determine if the input data is equivalent to a certain term within the UDL library.

At step 410, the UDL mapping output may be provided. The UDL mapping may be provided to a display on a mobile device (e.g., FIG. 1). Upon receiving the UDL mapping output, the system may receive an action response from a user at optional step 412. The action response may, for example, be an approval or disapproval of the proposed UDL mapping. Such manual inputs may be utilized by the system within method 400 in order to improve the UDL translator, specifically the ML algorithms that intelligently sort, define, and map input data with UDL library terms and data.

Figure 5:
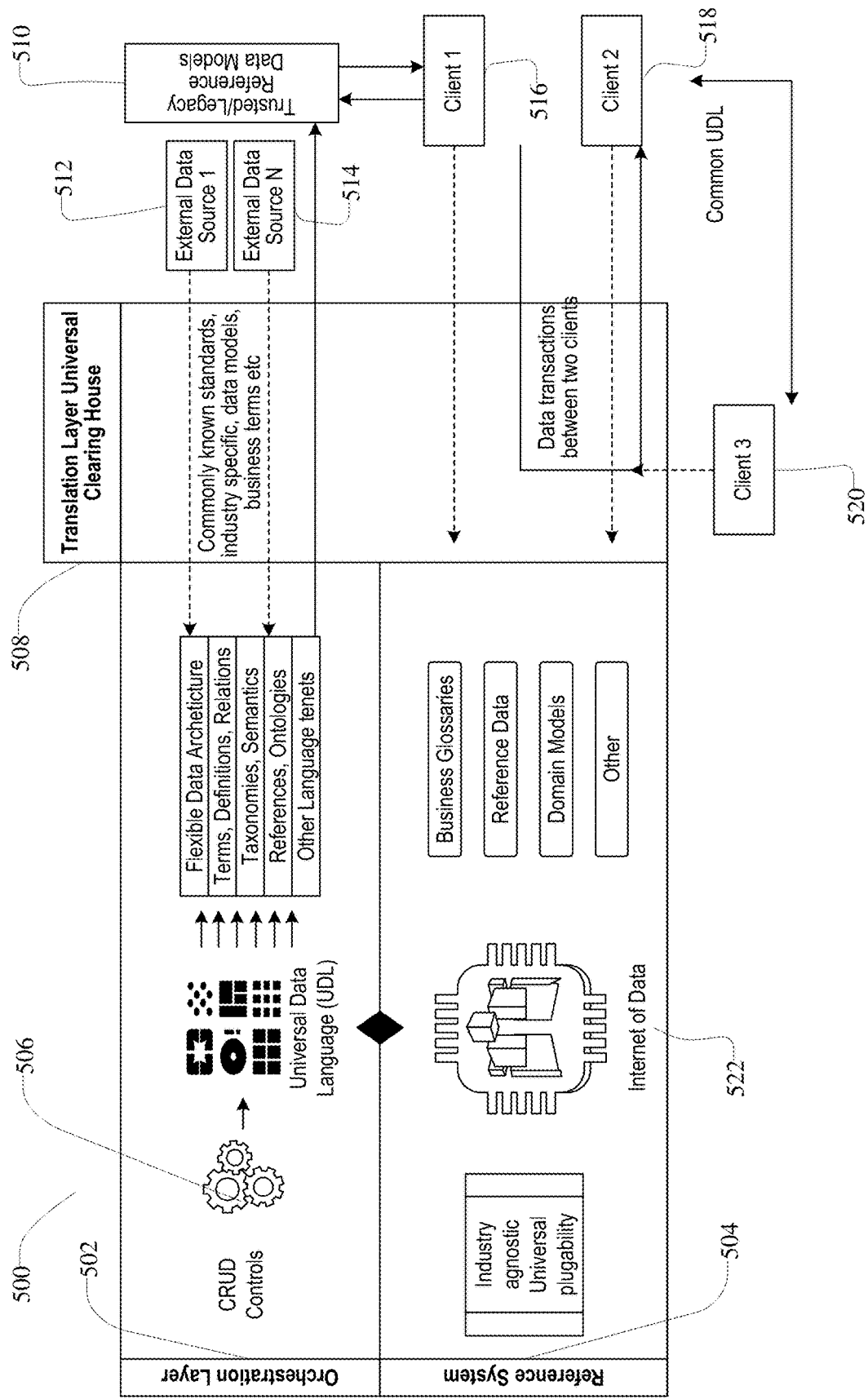
FIG. 5 illustrates an example of a distributed system for a universal data language translator that includes an Orchestration Layer and a Reference System.

FIG. 5 illustrates an example of a distributed system for a universal data language translator that includes an Orchestration Layer and a Reference System. Distributed system 500 includes an orchestration layer 502 and a reference system 504. The orchestration layer 502 provides the controls for improving and updating the universal data language (UDL) library/database. The orchestration layer 502 may rely upon CRUD controls 506, as previously described, to create, read, update, and delete certain UDL terms. The UDL library may be comprised of a flexible data structures and architectures with a matrix of standard terms, definitions, and term relations. Other components of the UDL library may include taxonomies and semantic mappings, references and ontologies, and other language tenets based on the language of the input data.

The system 500 may also be configured with a translation layer universal clearing house 508, wherein certain input data from external trusted sources may be used to update and improve the UDL library. The clearing house 508 may comprise a natural language processor with at least one ML algorithm that may process the incoming data, determine an appropriate definition of the incoming data terms, and map the incoming terms to particular UDL definitions and terms (i.e., harmonize the data). The UDL may also rely upon external data sources 512 and 514 that may be trusted external sources providing commonly known standards and industry-specific terms and data models to the UDL library. For example, a UDL library may comprise terms specific to the financial industry and then expand to include terms specific to the life sciences industry upon receiving input data from trusted external sources, where the input data is a life sciences common-use glossary of terms. This input data may be used as a baseline model by the UDL to establish a common semantic structure for dealing with data labels and naming conventions specifically within the life sciences industry. The UDL library may also receive data from legacy reference data models 510, such as certain foundational textbook glossaries. These legacy reference models may be used by clients, such as client 1, in order to harmonize its data labels with other clients, such as client 2 (518) and client 3 (520).

The system 500 may allow for data transactions among different clients using a common UDL. The clients wishing to exchange data may share their data via the clearing house 508, wherein the input data is translated to UDL. The output of the input data for both client 1 (516) and client 2 (518) may be a translated data file, where the data labels are the same. By translating the data inputs of client and client 2 into UDL, clients 1 and 2 may be able to better identify certain data that either client has or doesn't have, making it easier to transact for certain pieces of data between the clients.

The reference system 504 includes an internet of data 522 component, wherein the UDL library may constantly monitor public sources of information, such as business glossaries, reference data, domain models, keyword trends, search term volume, research papers, etc. This public data is constantly considered by the CRUD controls 506 in updating the UDL translator.

Figure 6:
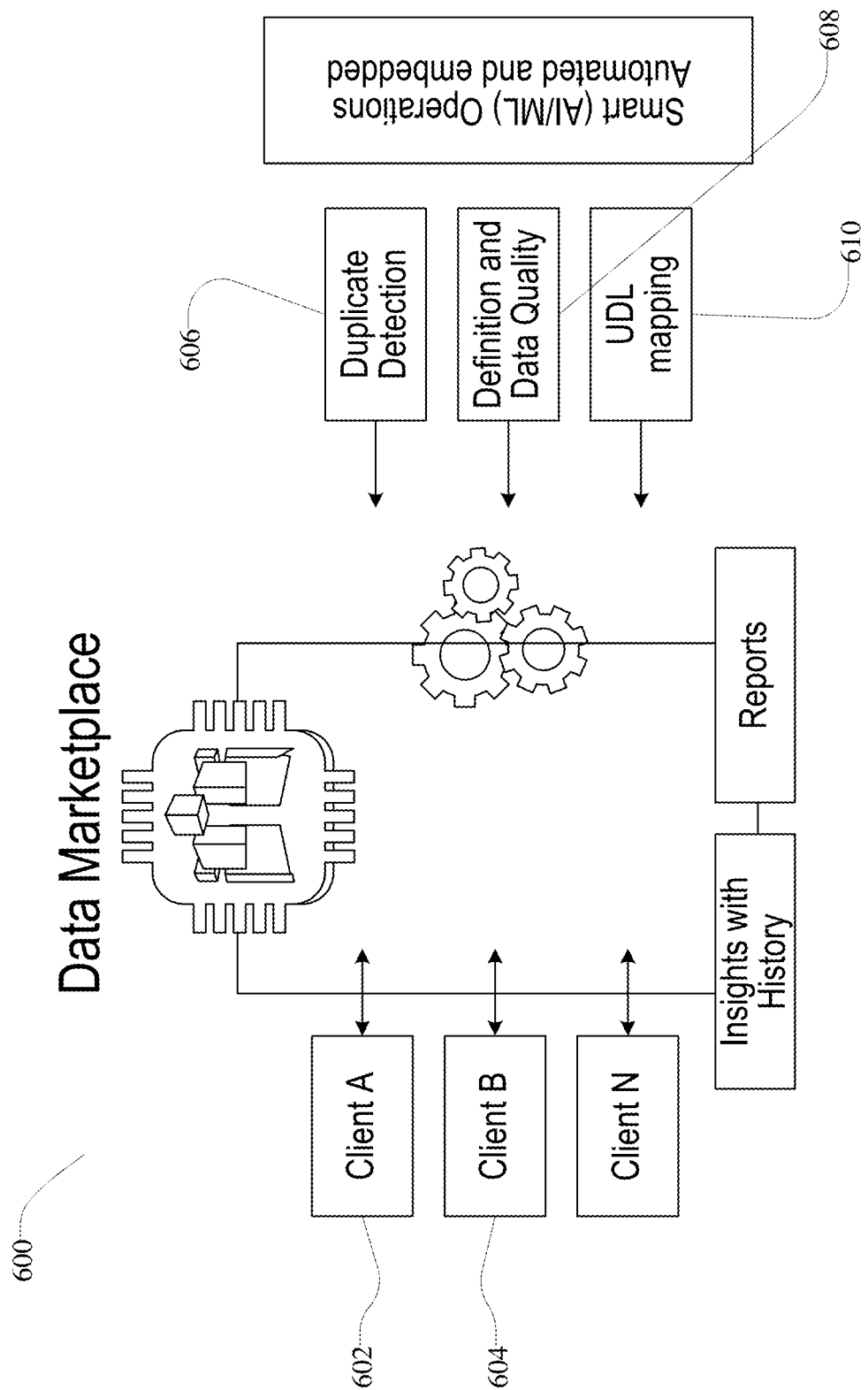
FIG. 6 illustrates an example data marketplace platform.

FIG. 6 illustrates an example data marketplace platform. Data marketplace platform 600 shows an example transaction occurring among client A (602), client B (604), and client N. The clients may upload their input data, which may have differences in data terminology. The input data may be processed with a UDL translator, and the output data may be translated data files using consistent terminology and definition based on the UDL described herein. The input data may be processed via tools, such as duplicate detection 606, definition and data quality 608, and UDL mapping 610. For example, client A may upload input data, whereby certain data labels are identified as being duplicates of each other, either internally to the uploaded dataset or to UDL definitions. Such duplicates may be removed from the dataset. Then, a subsequent analysis on the input data may occur that evaluates the definition and data quality of the uploaded data. For example, a certain data column may be titled "acid-test ratio." The UDL translator may analyze the accuracy of the data and determine that the equation that is used for the acid-test ratio fails to take into account business accruals. Based on comparing the acid-test ratio to a standardized UDL Definition of "quick ratio" (which has been determined to be equivalent terminology per the UDL library), the system may indicate that the data has poor quality because the underlying equation driving the results of the acid-test ratio is erroneous. This indication may be provided back to the user.

Despite the data quality analysis, the input data may be translated to UDL standard terms and labels. For instance, "acid-test ratio" may be translated to "quick ratio," since that's the standardized term used within the UDL library. Both terms are equivalent and mean the same thing, but the UDL library has been established with the term "quick ratio," rather than "acid-test ratio." Such determinations may be made using smart operations that are automated and embedded within a UDL Translator, such as NLP and ML algorithms.

In this example in FIG. 6, the data marketplace 600 comprises a UDL translator that may be implemented on the third-party servers that power the data marketplace 600. The UDL translator software may sit in an external server and receive input data uploaded by client A and/or client B. In such an architectural scheme, the UDL translation operations and UDL processing occurs offsite, in the cloud.

Figure 7:
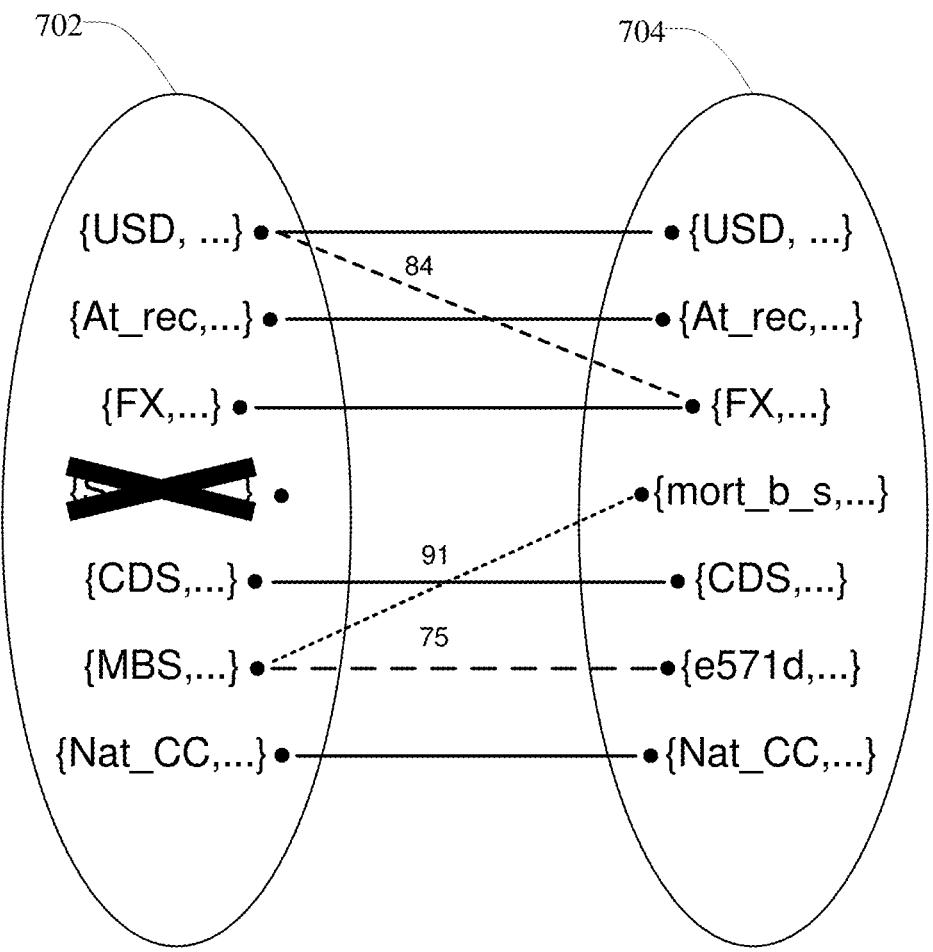
FIG. 7 illustrates an example of semantic and ontological matching within a universal data language translator, as described herein.

FIG. 7 illustrates an example of semantic and ontological matching within a universal data language translator, as described herein. On the left side of FIG. 7 is client input data 702, and on the right side is the UDL library 704. In this example, certain terms in the client input data 702 are first determined to be duplicate terms, such as {USD, . . . } and {FX, . . . }, which are both mapped to the UDL definition of {FX, . . . }. As indicated by dotted line 84, the term (USD, . . . ) may be deleted from the UDL translation output as an unnecessary duplicate. Further, one term in the input data 702 is crossed out. This may indicate an inactive or outdated data term. If the data is inactive, outdated, and/or inaccurate, the system may indicate to the user that this data should not be used and therefore does not translate that terminology to the UDL ontology.

Another example that is illustrated in FIG. 7 is the mapping between input data 702 term {MBS, . . . } and UDL terminology {e571d, . . . } and {mort_b_s, . . . }. The dash line 75 may indicate a partial mapping between the terms, and the dashed line 91 may indicate a possible duplicate mapping with the term (i.e., MBS may stand for "mort_b_s"). In some instances, the NLP and machine-learning algorithms may be able to solve these discrepancies automatically, as described herein. In other instances, the system may require manual input to resolve the inconsistencies and discrepancies. Such manual input may be recorded for future use by the NLP and machine-learning algorithms so that such decisions may be automated (i.e., increasing the intelligence of the UDL translator).

Figure 8:
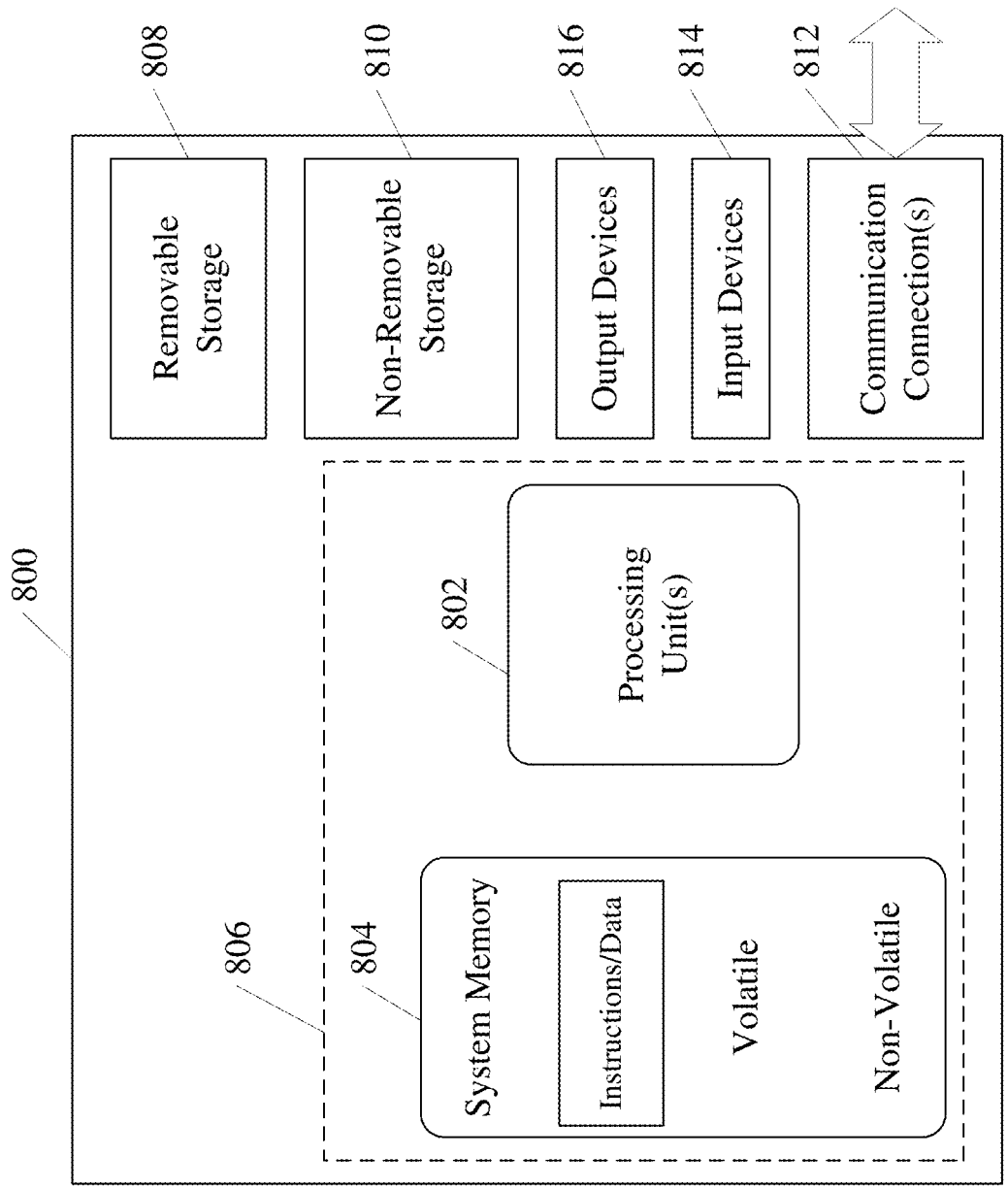
FIG. 8 illustrates one example of a suitable operating environment in which one or more of the present embodiments may be implemented.

FIG. 8 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 8 by dashed line 806. Further, environment 800 may also include storage devices (removable, 808, and/or non-removable, 810) including, but not limited to, magnetic or optical disks or tape. Similarly, environment 800 may also have input device(s) 814 such as keyboard, mouse, pen, voice input, etc. and/or output device(s) 816 such as a display, speakers, printer, etc. Also included in the environment may be one or more communication connections, 812, such as LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 800 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system for translating input data into a universal data language, comprising:
    a memory configured to store non-transitory computer readable instructions; and
    a processor communicatively coupled to the memory, wherein the processor, when
        executing the non-transitory computer readable instructions, is configured to:
        receive input data from at least one trusted source, wherein the input data comprises at least one data term;
        compare the at least one data term to at least one universal data language (UDL) library, wherein the at least one UDL library comprises a UDL entry for the at least one data term, wherein the at least one UDL library is comprised of a plurality of definitions from the at least one trusted source;
        train at least one machine learning algorithm on the at least one UDL library;
        process the at least one data term using the at least one machine learning algorithm to calculate a similarity score based on i) a similarity of context characteristics between the at least one data term and at least one UDL term in the at least one UDL library, and ii) a source of the at least one data term; and
        if the similarity score is above a similarity threshold, translate the at least one data term to the at least one UDL term in the at least one UDL library.

2. The system of claim 1, wherein the processor is further configured to:
    determine if the at least one data term is a duplicate of an already-existing UDL term in the at least one UDL library; and
    based on the at least one data term being determined to be the duplicate, map the at least one data term to the already-exiting UDL term.

3. The system of claim 2, wherein determining if the at least one data term is the duplicate of the already-existing UDL term comprises comparing each word or each character in the at least one data term with each word or each character with the already-existing UDL term.

4. The system of claim 2, wherein determining if the at least one data term is the duplicate of the already-existing UDL term comprises comparing a definition of the at least one data term to a definition to the already-existing UDL term.

5. The system of claim 4, wherein the definition of the at least one data term is at least one equation.

6. The system of claim 1, wherein the at least one trusted source is at least one of: a publisher of a business glossary, a publisher of a dictionary, and a publisher of industry-specific ontology.

7. The system of claim 1, wherein the processor is further configured to: format the at least one data term to conform to a formatting for the at least one UDL term.

8. The system of claim 1, wherein processing the at least one data term further comprises evaluating a level of accuracy of the at least one data term.

9. The system of claim 8, wherein the level of accuracy is determined based on at least one of: an inactivity score and an outdatedness score.

10. A method of creating a universal data language (UDL) translator, comprising:
    receiving input data from at least one trusted source, wherein the input data comprises a plurality of data terms from at least one business glossary;
    analyzing lexical features of each data term in the plurality of data terms;
    analyzing contextual features of each data term in the plurality of data terms;
    extracting at least one semantic ontology for each data term in the plurality of data terms;
    creating a UDL library, wherein the UDL library comprises a UDL entry for each data term in the plurality of data terms;
    training at least one machine learning algorithm on the UDL library;
    receiving client-specific input data, wherein the client-specific input data comprises a newly-received data term;
    processing the newly-received data term using the at least one machine learning algorithm by calculating a similarity score based on i) a similarity of context characteristics between the newly-received data term and at least one UDL term in the UDL library, and ii) a source of the newly-received data term; and
    mapping the newly-received data term to at least one UDL term in the UDL library.

11. The method of claim 10, wherein the at least one trusted source is at least one of: a publisher of a business glossary, a publisher of an industry-specific glossary, and a publisher of a business ontology.

12. The method of claim 10, wherein the similarity score is calculated by comparing each character or each word in the newly-received data term with each character or each word in the at least one UDL term.

13. The method of claim 10, wherein the similarity score is calculated by comparing a definition of the newly-received data term to a definition of the at least one UDL term, wherein the definition of the newly-received data term is an equation.

14. The method of claim 10, wherein the similarity score is calculated by comparing at least one domain classification of the newly-received data term with at least one domain classification of the at least one UDL term.

15. The method of claim 10, further comprising determining if the newly-received data term is a duplicate of a preexisting UDL term.

16. The method of claim 15, wherein determining if the newly-received data term is a duplicate of a preexisting UDL term comprises evaluating the similarity score.

17. The method of claim 10, wherein the UDL library is comprised of at least one general business ontology, at least one financial ontology, and at least one life sciences ontology.

18. A non-transitory computer-readable media storing computer executable instructions that when executed cause a computer system to perform a method for translating input data into a universal data language (UDL), comprising:
- receiving input data from at least one trusted source, wherein the input data comprises at least one data term;
- comparing the at least one data term to at least one universal data language (UDL) library, wherein the at least one UDL library comprises a UDL entry for the at least one data term;
- training at least one machine learning algorithm on the at least one UDL library;
- processing the at least one data term using the at least one machine learning algorithm to calculate a similarity score based on i) a similarity of context characteristics between the at least one data term and at least one UDL term in the at least one UDL library, and ii) a source of the at least one data term; and
- if the similarity score is above a similarity threshold, translating the at least one data term to the at least one UDL term in the at least one UDL library;
- determine if the at least one data term is a duplicate of an already-existing UDL term in the at least one UDL library; and
- based on the at least one data term being determined to be the duplicate, map the at least one data term to the already-exiting UDL term.

* * * * *